US010783205B2

(12) United States Patent
Ananthapur Bache et al.

(10) Patent No.: US 10,783,205 B2
(45) Date of Patent: Sep. 22, 2020

(54) MOBILE DEVICE HAVING COGNITIVE CONTACTS

(71) Applicant: INTERNATIONAL BUSINESS MACHINES CORPORATION, Armonk, NY (US)

(72) Inventors: Vijay Kumar Ananthapur Bache, Bangalore (IN); Vijay Ekambaram, Chennai (IN); Saravanan Sadacharam, Chennai (IN); Rengia R. Vasudevan, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 238 days.

(21) Appl. No.: 16/045,689

(22) Filed: Jul. 25, 2018

(65) Prior Publication Data
US 2020/0034446 A1 Jan. 30, 2020

(51) Int. Cl.
*G06F 16/9537* (2019.01)
*G06F 7/08* (2006.01)
(Continued)

(52) U.S. Cl.
CPC ..... *G06F 16/9537* (2019.01); *G01C 21/3679* (2013.01); *G06F 7/08* (2013.01);
(Continued)

(58) Field of Classification Search
CPC . G06F 16/29; G06F 16/9537; G01C 21/3679; H04W 4/021
See application file for complete search history.

(56) References Cited

U.S. PATENT DOCUMENTS 7,505,568 B2 * 3/2009 Simpson .............. G06Q 10/087
379/88.01
8,224,766 B2 7/2012 Skibiski et al.
(Continued)

OTHER PUBLICATIONS

Uta Christoph et al., "Context Detection on Mobile Devices", paper presented at the 2010 International Conference on Indoor Positioning and Indoor Navigation, vol. 15, 2010, all pages.
(Continued)

*Primary Examiner* — William Spieler
(74) *Attorney, Agent, or Firm* — Law Offices of Ira D. Blecker, P.C.

(57) ABSTRACT

A method of dynamically rendering cognitive contacts that includes: identifying transitory contacts of interest to a user of a mobile device in various contexts; identifying various contexts applicable to the user; sorting the transitory contacts of interest into transitory contact types; mapping the various contexts to the transitory contact types into a mapping table; deriving a present context pertaining to a user of the mobile device; querying the mapping table for transitory contact types applicable to the present context; dynamically rendering the applicable transitory contact types to the user in a transitory contacts screen on the mobile device; and responsive to the user selecting one of the applicable transitory contact types, displaying the transitory contacts of interest in the transitory contacts screen on the mobile device corresponding to the transitory contact type.

20 Claims, 5 Drawing Sheets

(51) Int. Cl.
*G06F 16/245* (2019.01)
*G06F 16/248* (2019.01)
*G06F 16/22* (2019.01)
*G06F 16/9535* (2019.01)
*G06F 16/29* (2019.01)
*G06F 21/36* (2013.01)
*H04W 4/021* (2018.01)
*G01C 21/36* (2006.01)

(52) U.S. Cl.
CPC ........ *G06F 16/2282* (2019.01); *G06F 16/245* (2019.01); *G06F 16/248* (2019.01); *G06F 16/29* (2019.01); *G06F 16/9535* (2019.01); *H04W 4/021* (2013.01)

(56) References Cited

U.S. PATENT DOCUMENTS

| | | | |
|---|---|---|---|
| 8,577,895 | B2 | 11/2013 | Gupta et al. |
| 8,755,968 | B2* | 6/2014 | Gottlieb ............ G01C 21/3697 701/36 |
| 8,959,098 | B2 | 2/2015 | Skibiski et al. |
| 9,363,347 | B2 | 6/2016 | Koberg et al. |
| 9,719,798 | B2* | 8/2017 | Gottlieb ............ G01C 21/3697 |
| 2005/0255861 | A1* | 11/2005 | Wilson ................. H04W 4/029 455/456.2 |
| 2005/0289180 | A1* | 12/2005 | Pabla ................ G06Q 10/109 |
| 2007/0150444 | A1* | 6/2007 | Chesnais ................ H04L 67/18 |
| 2009/0198767 | A1* | 8/2009 | Jakobson ............ G06F 16/951 709/203 |
| 2009/0265099 | A1* | 10/2009 | Gottlieb ............ G01C 21/3697 701/532 |
| 2010/0041391 | A1 | 2/2010 | Spivey et al. |
| 2010/0228474 | A1* | 9/2010 | Paterson ............. G09B 29/102 701/532 |
| 2011/0208797 | A1 | 8/2011 | Kim |
| 2011/0320318 | A1 | 12/2011 | Patel et al. |
| 2012/0191777 | A1* | 7/2012 | Iwasaki ................ G06Q 10/101 709/204 |
| 2013/0040626 | A1 | 2/2013 | Morgaine |
| 2013/0097518 | A1 | 4/2013 | Pearcy |
| 2013/0346217 | A1 | 12/2013 | Pandey et al. |
| 2014/0180760 | A1 | 6/2014 | Karatzoglou |
| 2014/0199663 | A1 | 7/2014 | Sadeh-Koniecpol et al. |
| 2014/0278066 | A1* | 9/2014 | Gottlieb ............ G01C 21/3697 701/454 |
| 2014/0289268 | A1* | 9/2014 | Patil ................... G06F 16/9535 707/765 |
| 2014/0304279 | A1* | 10/2014 | Fuchs ................ G06F 16/2465 707/750 |
| 2015/0199774 | A1* | 7/2015 | Gottesman ............ G06Q 50/01 705/14.39 |
| 2015/0302054 | A1 | 10/2015 | Spanos |
| 2016/0063054 | A1* | 3/2016 | Thompson ......... G06Q 30/0217 705/7.32 |
| 2016/0063389 | A1* | 3/2016 | Fuchs ................... G06F 16/211 706/12 |
| 2017/0242553 | A1 | 8/2017 | Dey et al. |
| 2017/0299403 | A1* | 10/2017 | Gottlieb ............ G01C 21/3682 |

OTHER PUBLICATIONS

O. Brdiczka et al., "Learning situation models for providing context-aware services." In: Stephanidis C. (eds) Universal Access in Human-Computer Interaction. Ambient Interaction. UAHCI 2007. Lecture Notes in Computer Science, vol. 4555. Springer, Berlin, Heidelberg, all pages.

Margaret Rouse, "Cognitive Computing", [online], [retrieved on Jan. 17, 2017]. Retrieved from the Internet <URL: https://searchenterpriseai.techtarget.com/definition/cognitive-computing>, all pages.

* cited by examiner

| CONTEXT | TRANSITORY CONTACT TYPES |
|---|---|
| TIME - MORNING | RESTAURANT (BREAKFAST) |
| TIME - AFTERNOON | RESTAURANT (EAT-IN, LUNCH) |
| TIME - AFTERNOON | RESTAURANT (DELIVERY, LUNCH) |
| LOCATION | RESTAURANT (DELIVERY, EAT-IN) |
| EMERGENCY | HOSPITALS |
| TRANSPORTATION | ROAD (CAR TRAVEL) |
| TRANSPORTATION | TRAIN |
| SPEED OF TRAVEL | REST AREAS, RESTAURANTS, FUEL |

FIG. 3

| PRESENT CONTEXT | TRANSITORY CONTACT TYPES |
|---|---|
| DRIVING ON ROAD, SPEED (SLOW)/TIME (LATE AFTERNOON)/TRAFFIC (SLOW)-POSSIBLE DELAY | LODGING, RESTAURANTS, AUTOMOTIVE |

MOBILE DEVICE HAVING COGNITIVE CONTACTS

BACKGROUND

The present exemplary embodiments pertain to displaying transitory contacts on a mobile device and, more particularly, pertain to automatically displaying transitory contacts pertaining to a user's context and automatically removing the transitory contacts when the user's context changes.

Current mobile devices may only display contacts stored by the user in the mobile device. These contacts represent static information that may be added, removed and updated manually by the user.

BRIEF SUMMARY

The various advantages and purposes of the exemplary embodiments as described above and hereafter are achieved by providing, according to an aspect of the exemplary embodiments, a method of dynamically rendering cognitive contacts comprising: identifying transitory contacts of interest to a user of a mobile device in various contexts wherein the transitory contacts of interest are exclusive of stored contacts on the user's mobile device; identifying various contexts applicable to the user; sorting the transitory contacts of interest into transitory contact types; mapping the various contexts to the transitory contact types into a mapping table in memory of the mobile device; deriving a present context pertaining to a user of the mobile device; querying the mapping table for transitory contact types applicable to the present context; dynamically rendering the applicable transitory contact types to the user in a transitory contacts screen on the mobile device such that the applicable transitory contact types are displayed in the transitory contact screen on the mobile device, are specific to the present context and are subject to change when the present context changes; and responsive to the user selecting one of the applicable transitory contact types, displaying the transitory contacts of interest in the transitory contacts screen on the mobile device corresponding to the transitory contact type.

According to another aspect of the exemplary embodiments, there is provided a mobile device having dynamically rendered cognitive contacts comprising: a display; a non-transitory storage medium that stores instructions; and a processor having a memory that executes the instructions to: identify transitory contacts of interest to a user of a mobile device in various contexts wherein the transitory contacts of interest are exclusive of stored contacts on the user's mobile device; identify various contexts applicable to the user; sort the transitory contacts of interest into transitory contact types; map the various contexts to the transitory contact types into a mapping table in the memory of the mobile device; derive a present context pertaining to a user of the mobile device; query the mapping table for transitory contact types applicable to the present context; dynamically render the applicable transitory contact types to the user in a transitory contacts screen on the display of the mobile device such that the applicable transitory contact types are displayed in the transitory contact screen on the mobile device, are specific to the present context and are subject to change when the present context changes; and responsive to the user selects one of the applicable transitory contact types, display the transitory contacts of interest in the transitory contacts screen on the display of the mobile device corresponding to the transitory contact type.

According to a further aspect of the exemplary embodiments, there is provided a computer program product for dynamically rendering cognitive contacts comprising a computer readable storage medium having program instructions embodied therewith, the program instructions executable by a processor to cause the processor to perform a method comprising: identifying transitory contacts of interest to a user of a mobile device in various contexts wherein the transitory contacts of interest are exclusive of stored contacts on the user's mobile device; identifying various contexts applicable to the user; sorting the transitory contacts of interest into transitory contact types; mapping the various contexts to the transitory contact types into a mapping table in memory of the mobile device; deriving a present context pertaining to a user of the mobile device; querying the mapping table for transitory contact types applicable to the present context; dynamically rendering the applicable transitory contact types to the user in a transitory contacts screen on the mobile device such that the applicable transitory contact types are displayed in the transitory contact screen on the mobile device, are specific to the present context and are subject to change when the present context changes; and responsive to the user selecting one of the applicable transitory contact types, displaying the transitory contacts of interest in the transitory contacts screen on the mobile device corresponding to the transitory contact type.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

As noted above, a user's list of contacts is typically static and may only be changed by the user on a manual basis. However, a user's context may periodically change. As used herein, context means the user's current location and the user's situation at the current location.

Context may be more specifically defined to include human factors such as information on the user (knowledge of habits, emotional state, biophysiological conditions), the user's social environment (co-location of others, social interaction, group dynamics), and the user's tasks (spontaneous activity, engaged tasks, general goals). Context may be further specifically defined to include context related to physical environment such as location (absolute position, relative position, co-location), infrastructure (surrounding resources for computation, communication, task performance), and physical conditions (noise, light, pressure, air quality).

Context as used herein may include all of the above defined areas of context.

Contacts may be static such as those stored in a user's mobile device. These contacts are hereafter referred as stored contacts. However, as a user's context changes, the user's contacts may change. These changeable contacts are hereafter referred to as transitory contacts.

The exemplary embodiments pertain to cognitive contacts associated with a contacts screen in a mobile device which may auto-fetch the transitory contacts pertinent to a user's context and display them on the contacts screen. Cognition simulates human thought processes in a computerized model and involves self-learning systems that use data mining, pattern recognition and natural language processing to mimic the way the human brain works. The goal of the cognitive contacts is to be able to provide transitory contacts to a user's mobile device without requiring human assistance.

When the user's context changes, the transitory contacts may be auto-removed from the contacts screen so the only transitory contacts displayed are those pertaining to the user's current context. While the exemplary embodiments primarily pertain to the transitory contacts, it is within the scope of the exemplary embodiments to store or archive any of the transitory contacts that may be of interest to the user. Once stored, these former transitory contacts are now stored contacts and are no longer part of the exemplary embodiments.

The only contacts displayed in the transitory contacts screen are the transitory contacts. The transitory contacts have no effect on the stored contacts.

The exemplary embodiments may be applicable to any mobile device including but not limited to a cell phone, tablet or laptop.

Figure 1:
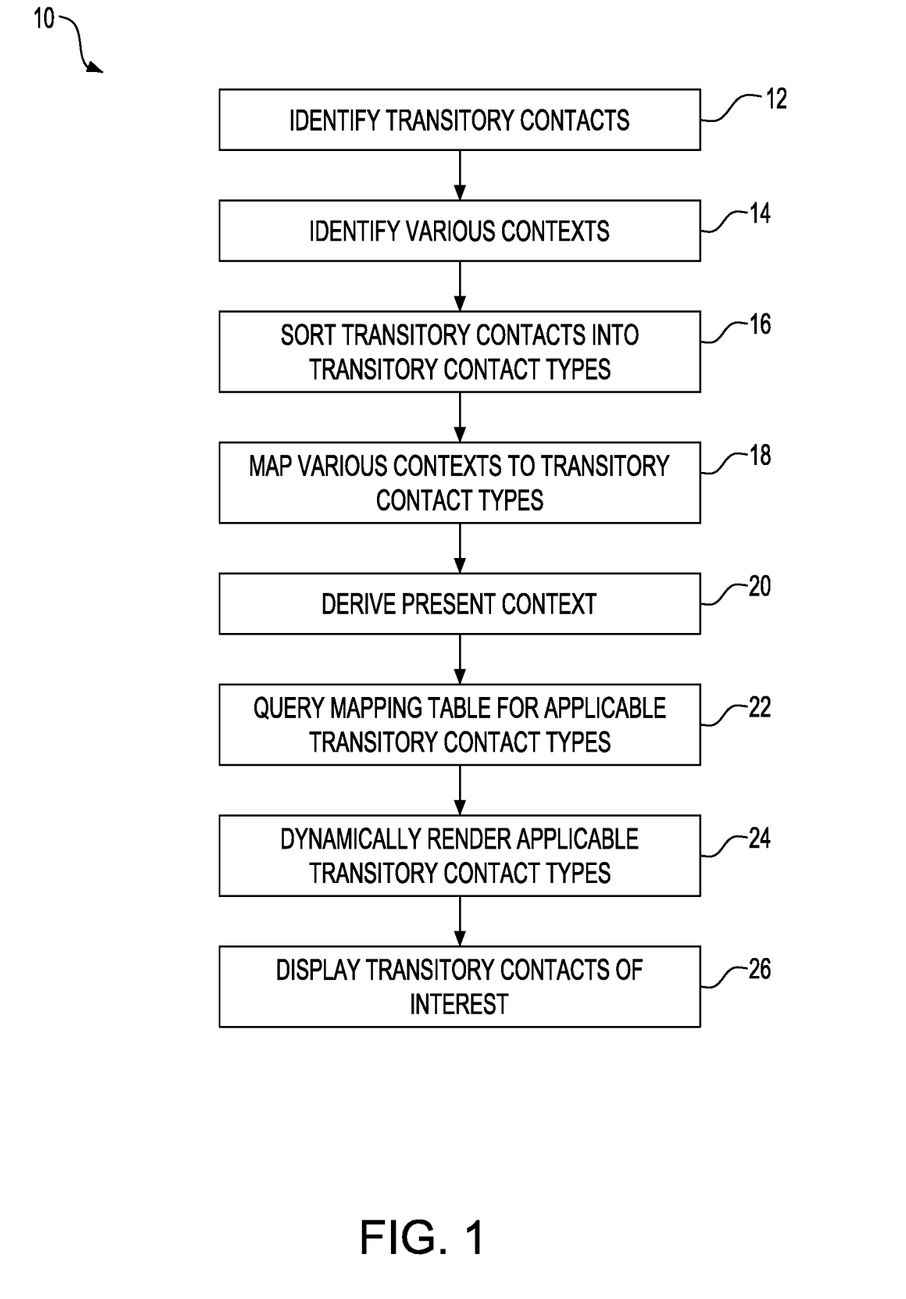
FIG. 1 illustrates a method of dynamically rendering cognitive contacts.

Referring to the Figures in more detail, and particularly referring to FIG. 1, there is illustrated in one exemplary embodiment a method 10 of dynamically rendering cognitive contacts. Transitory contacts of interest may be identified to a user of a mobile device in various contexts, box 12. To be clear, the transitory contacts of interest are exclusive of any stored contacts on the user's mobile device.

By performing crowd-sourcing analysis, possible transitory contacts may be determined that may be of interest to the user in various contexts. For example, if the user context is lunch or dinner time, then transitory contact details of different hotels, motels and various eating establishments may be identified of interest to the user. If user context is location, then location-specific transitory contacts such as tourism sites, places to stay, food establishments may be of interest to the user. If the user context is medical emergency, then emergency medical facilities, such as hospitals and urgent care centers near to the user's proximity may be of interest.

Crowd-sourcing may include searching the Internet, social data such as friends' and families' stored contacts on social media and telephone directories for different transitory contacts.

Information about the user may be utilized to determine what various contexts may be applicable to the user, box 14. In this regard, user behavior, sleep patterns, food and hotel preferences, call history, text history and social data may all be utilized.

The transitory contacts of interest may be sorted into transitory contact types, box 16. For example, different food establishments may be sorted into transitory contact types such as restaurants, diners, food trucks, etc. In one exemplary embodiment, these different food establishments may all be grouped together into a contact type of eating establishments. The mobile device may have controls to make the contact types more specific or more general so that the cognitive contact types generated may similarly be more general or more specific.

Figure 3:
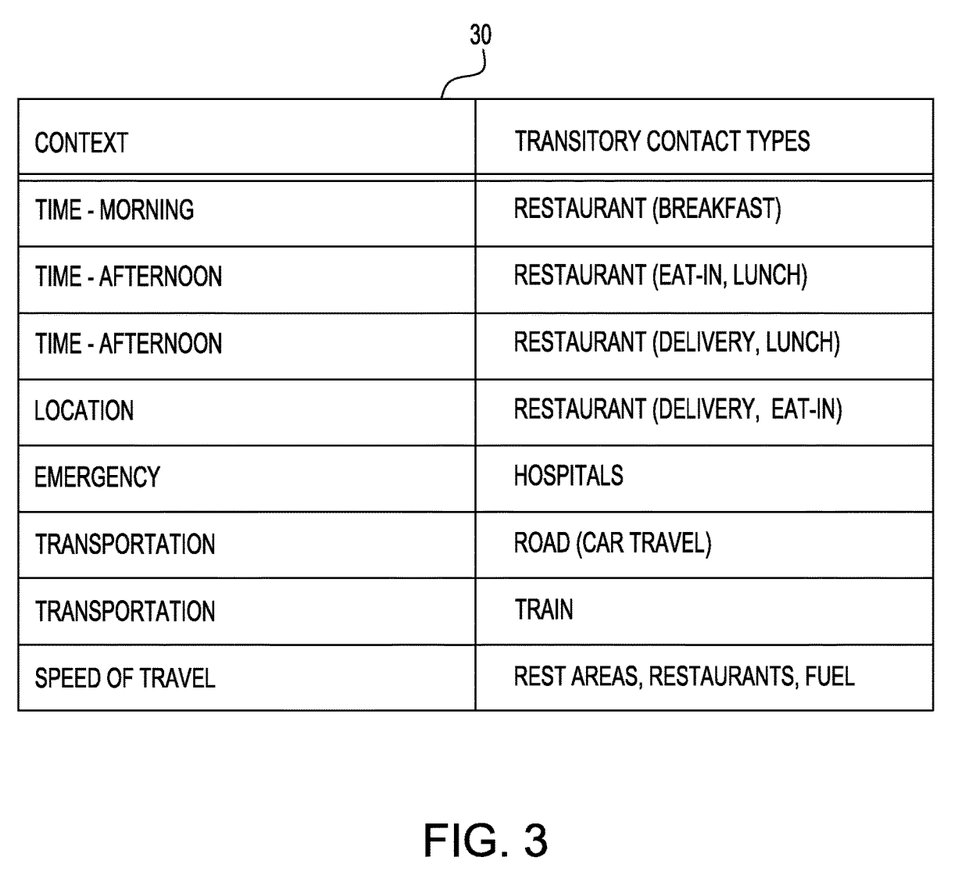
FIG. 3 illustrates a mapping table for mapping a context to transitory contact types.
Figure 4:
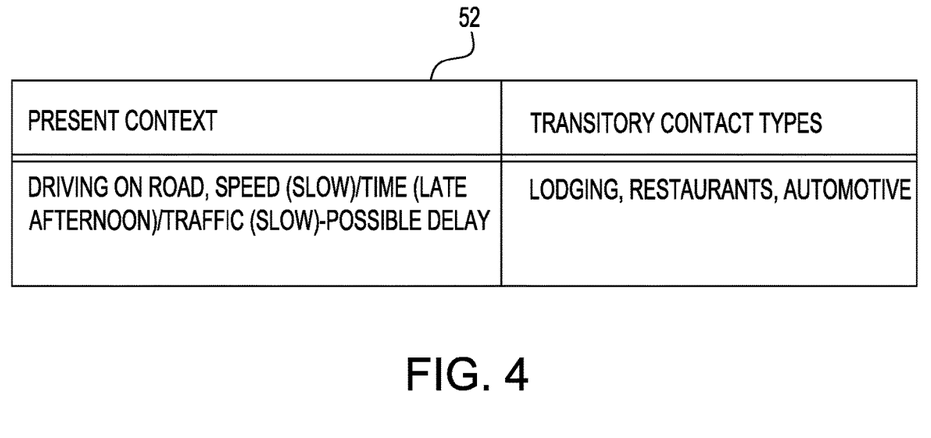
FIG. 4 illustrates a first table of present context and transitory contact types applicable to the present context.

The transitory contact types and various contexts may be mapped into a mapping table such as mapping table 30 illustrated in FIG. 3. As shown in FIG. 3, the mapping table 30 has been organized by a column for context and another column for transitory contact types. The contexts and transitory contact types shown in FIG. 3 are only for purposes of illustration and not limitation and, further, are not meant to be inclusive of all contexts and transitory contact types.

The mapping table 30 may be developed through crowd-sourcing analysis by deriving patterns of the users who searched for various contacts in various contexts. This mapping could also be manually initialized and fine-tuned over time using learning models.

A present context pertaining to the user of the mobile device may be derived with respect to time, location, events, past-history using existing context modelling techniques, box 20.

Context modeling defines how context data are structured and maintained and aims to produce a formal or semi-formal description of the context information that is present in a context-aware system. In other words, the context is the surrounding element for the system, and a model provides the mathematical interface and a behavioral description of the surrounding environment. A key role of context modeling is to simplify and introduce greater structure into the task of developing context-aware applications.

In one example of context modeling of a physical environment, a context model defines the external interfaces that a system will interact with. A context model used during design defines land, aquatic, or atmospheric characteristics (stated in terms of mathematical algorithms or a simulation) that the eventual product will face in the real environment.

For each context derived, the mapping table 30 may be queried for contact types applicable to the present context, box 22.

In terms of system operation, the absolute values with respect to the user context are extracted. For example, if the user context is location, then the absolute value may be the actual name of the location. Then, the system queries online to extract relevant transitory contacts with respect to the absolute values of the user context. The extracted relevant transitory contacts may be grouped according to their transitory contact type.

The applicable contact types are dynamically rendered to the user in a transitory contacts screen on the mobile device wherein the applicable contact types are displayed in the transitory contacts screen on the mobile device, box 24.

These transitory contact types are specific to the present context and are subject to change when the present context changes.

Generally speaking, the system learns various contact types (automotive, food, hotel, hospital) for various user contexts (example: need for hotel) through crowd-sourced approach and based on the localized user context (example: need for hotel in Raj Town). The system searches the web and other data-sources to discover relevant transitory contacts and render them to the user in the transitory contacts screen on the mobile device. Once the user moves to a new context, the old rendered transitory contacts get disappeared.

When the transitory contact types are displayed to the user in the transitory contacts screen, the user may select one of the applicable transitory contact types, and responsive thereto, the transitory contacts of interest are displayed in the transitory contacts screen on the mobile device corresponding to the contact type, box 26.

Figure 2:
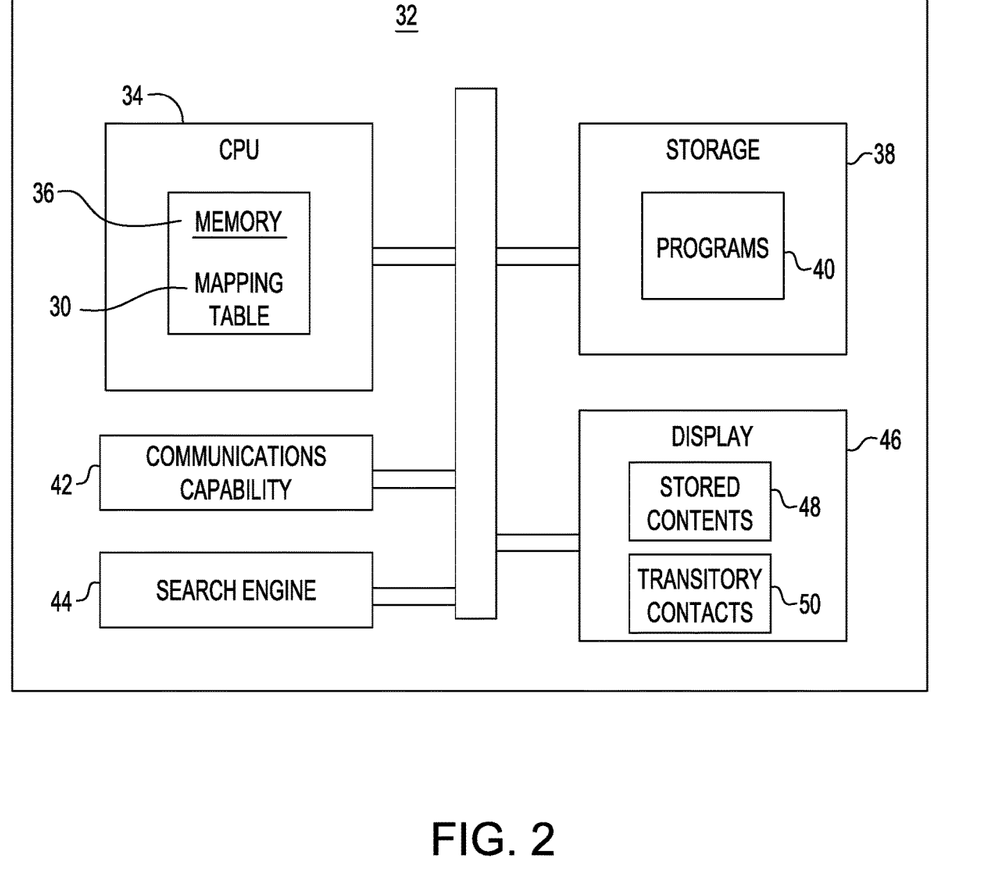
FIG. 2 illustrates an electronic device for implementing the exemplary embodiments.

One or more of the exemplary embodiments may be implemented on an electronic device 32 illustrated in FIG. 2. The electronic device 32 may include a central processing unit (CPU) 34 having memory 36. Contained within memory 36 may be the mapping table 30 illustrated in FIG. 3.

Further contained within electronic device 32 may be storage 38. Alternatively, storage 38 may be remotely connected to electronic device 32. Contained within storage 38 may be programs 40 having program instructions to perform the method 10 illustrated in FIG. 1.

The electronic device 32 may further include communications capability instructions 42 to allow electronic device 42 to communicate with the outside world such as by WiFi, cellular, wired or short range radio capabilities. There may also be search engine instructions 44 to search the Internet.

Additionally, electronic device 32 may have display instructions 46 to operate a display for the electronic device 32. Display instructions 46 may further include stored contacts instructions to handle the storage and display of stored contacts. In one exemplary embodiment, a stored contacts screen may be displayed on the electronic device display when requested by a user such as by touching the display in a portion having a "stored contacts" button. Transitory contacts instructions 50 may also be included within the display instructions 46. In one exemplary embodiment, transitory contacts may be automatically displayed when a user's context changes. In another exemplary embodiment, the transitory contacts are only displayed when specifically requested by the user such as touching a "transitory contacts" button on the display.

The operation of the mobile device may be illustrated by an example shown in FIGS. 4 to 7.

A user is driving to a location with family on a vacation and due to a traffic jam or other traffic incident, the user and family are delayed. Based on the calendar (vacation), emails (hotel booking, etc.) and date/time of journey, the electronic device 32 within a mobile device 54 (FIG. 5) predicts that the user and family are going on vacation or a long trip. Further, based on the users GPS location, the electronic device 32 may predict that the user and family are traveling on the road versus a train. Based on the speed/time/traffic, the electronic device may predict that the user and family are stuck and may get delayed to reach their destination.

Based on the above facts, the electronic device 32 may derive the user's present context as "DRIVING ON ROAD, SPEED (SLOW)/TIME (LATE AFTERNOON)/TRAFFIC (SLOW)-POSSIBLE DELAY". This information may be placed in table 52 illustrated in FIG. 4. The mapping table 30 may then be queried using the present context to obtain the transitory contact types illustrated in table 52 in FIG. 4.

Figure 5:
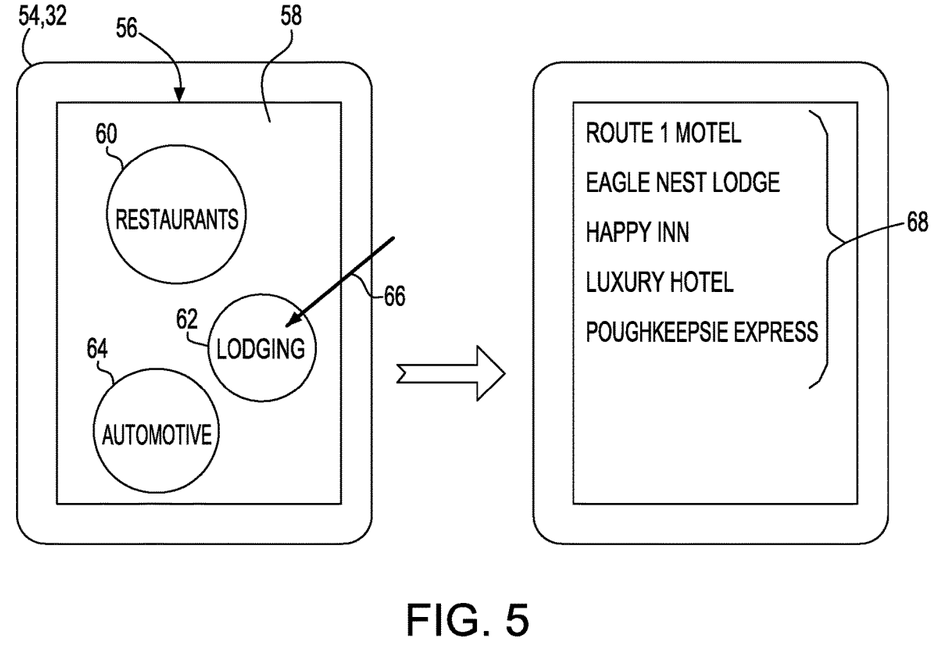
FIG. 5 illustrates a mobile device a mobile having the transitory contact types of FIG. 4 displayed in a transitory contacts screen and subsequent to selecting one of the transitory contact types, displaying the corresponding transitory contacts in the transitory contacts screen.

Referring now to the left side of FIG. 5, there is illustrated the mobile device 54 having a display 56 and on the display 56 there is shown a transitory contacts screen 58. The transitory contacts screen 58 displays the transitory contact types shown in table 52 in FIG. 4. The transitory contact types are restaurants 60, lodging 62 and automotive 64. The various transitory contact types 60, 62, 64 may be graphically illustrated in a variety of ways. The left side of FIG. 5 shows the transitory contact types 60, 62, 64 as bubbles with the larger bubbles being those with the highest probability of corresponding to the user's present context.

The user has decided to select, indicated by arrow 66, the lodging transitory contact type by pressing or otherwise indicating the bubble for the lodging transitory contact type 62.

Referring now to the right side of FIG. 5, with the selection of the lodging transitory contact type 62, the electronic device 32 automatically searches for the nearest hotels/motels/lodges and adds those hotels/motels/lodges on the transitory contacts screen 58 so that the actual transitory contacts 68, that is the names of the different lodging businesses, are displayed on the transitory contacts screen 58. The electronic device 32 may also use social media and your friends' data to identify and prioritize the hotels/motels/lodging that the user's friends may have rated high.

The user does not have to search for these hotels/motels/lodging as they are automatically provided to the user in the transitory contacts screen 58.

Sometime later, the user may be home alone and wants to plan some lunch. The user is undecided about whether the user should eat in a restaurant or have food delivered. Based on the time of the day and the user's location, the electronic device 32 understands that the user is at home at a lunch/dinner time. Based on the user's web searches or telephone calls, the electronic device 32 picks key words such as food, delivery etc. and predicts that the user is planning a lunch/dinner, either to eat in the restaurant or to be delivered. The electronic device 32 derives the user's present context as "LOCATION (HOME), TIME (AFTERNOON)". This information may be placed in table 70, FIG. 6, as the present context. The mapping table 30 may then be queried using the present context to obtain the transitory contact types illustrated in table 70 in FIG. 6.

Figure 6:
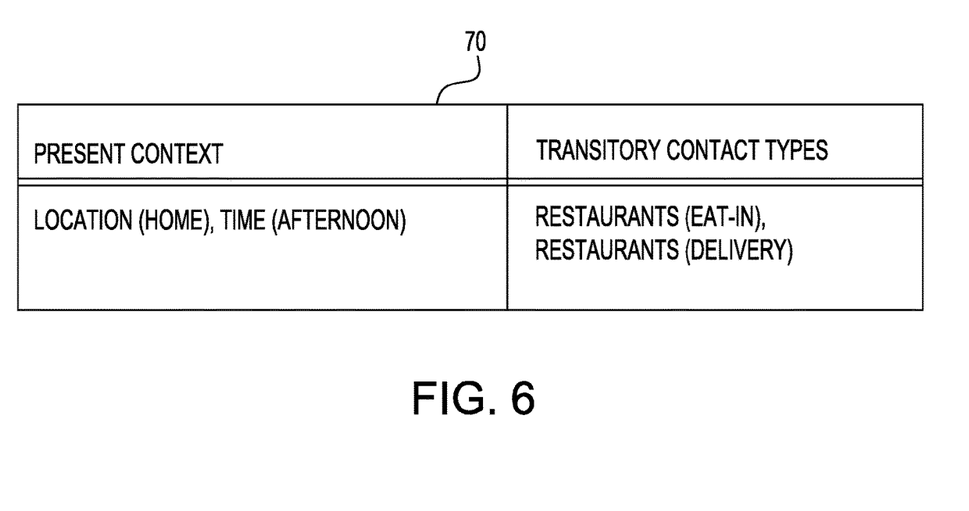
FIG. 6 illustrates a second table of present context and transitory contact types applicable to the present context wherein the present context is different than in FIG. 4.
Figure 7:
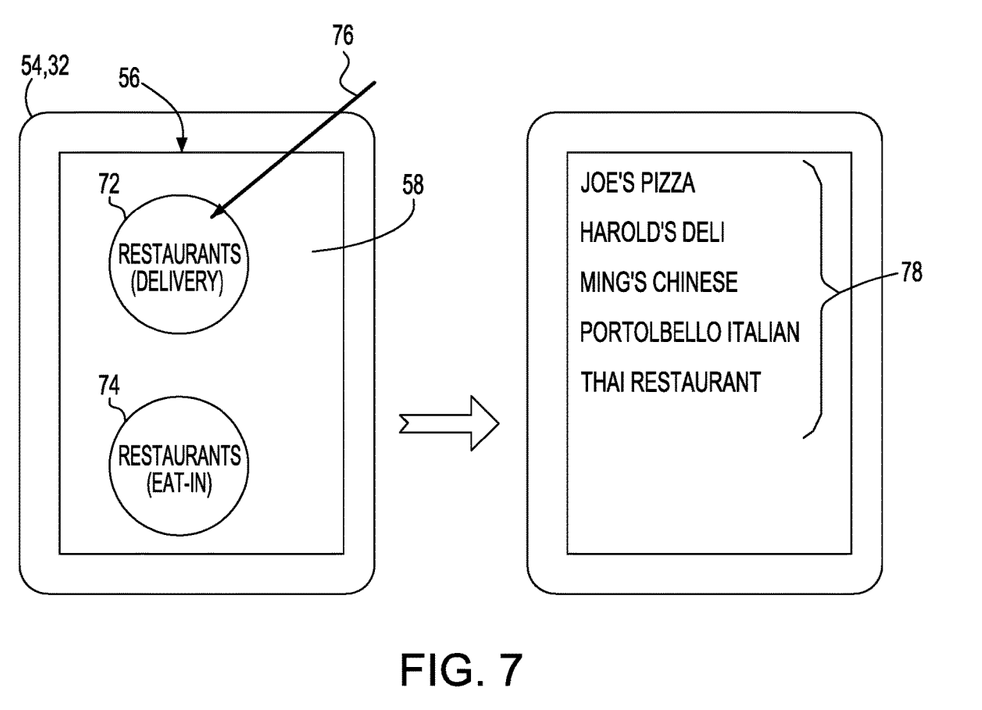
FIG. 7 illustrates a mobile device a mobile having the transitory contact types of FIG. 6 displayed in a transitory contacts screen and subsequent to selecting one of the transitory contact types, displaying the corresponding transitory contacts in the transitory contacts screen.

Referring now to the left side of FIG. 7, there is illustrated the mobile device 54 having the display 56 and on the display 56 there is shown the transitory contacts screen 58. The transitory contacts screen 58 displays the transitory contact types shown in table 70 in FIG. 6. The transitory contact types are restaurants (delivery) 72 and restaurants (eat-in) 74.

The user has decided to select, indicated by arrow 76, the restaurants (delivery) transitory contact type 72 by pressing or otherwise indicating the bubble for the restaurants (delivery) transitory contact type 72.

Referring now to the right side of FIG. 7, with the selection of the restaurants (delivery) transitory contact type 72, the electronic device 32 automatically searches for the nearest restaurants that deliver and adds those restaurants on the transitory contacts screen 58 so that the actual transitory contacts 78, that is the names of the different restaurants that deliver, are displayed on the transitory contacts screen 58. The electronic device 32 may also use social media and your friends' data to identify and prioritize the different restaurants that deliver that the user's friends may have rated high.

The user does not have to search for these different restaurants that deliver as they are automatically provided to the user in the transitory contacts screen 58.

It is noted that the transitory contact types and transitory contacts provided on the transitory contact screen 58 differ between FIGS. 5 and 7. This is because the transitory contact types and transitory contacts are truly transitory so that as the user's present context changes between FIGS. 5 and 7, the transitory contact types and transitory contacts in FIG. 5 auto-disappear and are replaced by the transitory contact types and transitory contacts in FIG. 7 that correspond to the user's new present context as illustrated in FIG. 6.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A computer-implemented method of dynamically rendering cognitive contacts comprising:
   identifying transitory contacts of interest to a user of a mobile device in various contexts wherein the transitory contacts of interest are exclusive of stored contacts on the user's mobile device;
   identifying various contexts applicable to the user;
   sorting the transitory contacts of interest into transitory contact types;
   mapping the various contexts to the transitory contact types into a mapping table in memory of the mobile device;
   deriving a present context pertaining to a user of the mobile device;
   querying the mapping table for transitory contact types applicable to the present context;
   dynamically rendering the applicable transitory contact types to the user in a transitory contacts screen on the mobile device such that the applicable transitory contact types are displayed in the transitory contact screen on the mobile device, are specific to the present context and are subject to change when the present context changes; and
   responsive to the user selecting one of the applicable transitory contact types, displaying the transitory contacts of interest in the transitory contacts screen on the mobile device corresponding to the transitory contact type;
   wherein the method is performed by a processor.

2. The method of claim 1 further comprising monitoring the present context of the user and responsive to a change in the present context, repeating querying, dynamically rendering and displaying.

3. The method of claim 2 further comprising automatically removing the transitory contact types from the transitory contact screen when the present context changes and one or more transitory contact types previously displayed in the transitory contact screen are no longer applicable to the present context.

4. The method of claim 1 wherein the present context is the user's current location and the user's situation at the current location.

5. The method of claim 1 wherein the transitory contacts of interest are location-specific transitory contacts that may be applicable to the user in the user's current location.

6. The method of claim 1 wherein identifying various transitory contacts includes searching the internet and searching social data of the user, the user's friends and the user's stored contacts.

7. The method of claim 1 wherein dynamically rendering the applicable transitory contact types automatically appears in the transitory contacts screen of the mobile device for any present context.

8. A mobile device having dynamically rendered cognitive contacts comprising:
   a display;
   a non-transitory storage medium that stores instructions; and
   a processor having a memory that executes the instructions to:
      identify transitory contacts of interest to a user of a mobile device in various contexts wherein the transitory contacts of interest are exclusive of stored contacts on the user's mobile device;
      identify various contexts applicable to the user;
      sort the transitory contacts of interest into transitory contact types;
      map the various contexts to the transitory contact types into a mapping table in the memory of the mobile device;
      derive a present context pertaining to a user of the mobile device;
      query the mapping table for transitory contact types applicable to the present context; and
      dynamically render the applicable transitory contact types to the user in a transitory contacts screen on the display of the mobile device such that the applicable transitory contact types are displayed in the transitory contact screen on the mobile device, are specific to the present context and are subject to change when the present context changes; and
      responsive to the user selects one of the applicable transitory contact types, display the transitory contacts of interest in the transitory contacts screen on the display of the mobile device corresponding to the transitory contact type.

9. The mobile device of claim 8 wherein the processor that executes the instruction further comprises to monitor the present context of the user and responsive to a change in the present context, repeat querying, dynamically render and display.

10. The mobile device of claim 9 wherein the processor that executes the instruction further comprises to automatically remove the transitory contact types from the transitory contact screen when the present context changes and one or more transitory contact types previously displayed in the transitory contact screen are no longer applicable to the present context.

11. The mobile device of claim 8 wherein the present context is the user's current location and the user's situation at the current location.

12. The mobile device of claim 8 wherein the transitory contacts of interest are location-specific transitory contacts that may be applicable to the user in the user's current location.

13. The mobile device of claim 8 wherein the processor that executes the instruction to identify various transitory contacts includes to search the internet and searching social data of the user, the user's friends and the user's stored contacts.

14. The mobile device of claim 8 wherein the processor that executes the instruction to dynamically render the applicable transitory contact types automatically appears in the transitory contacts screen of the mobile device for any present context.

15. A computer program product for dynamically rendering cognitive contacts comprising a computer readable storage medium having program instructions embodied therewith, the program instructions executable by a processor to cause the processor to perform a method comprising:
- identifying transitory contacts of interest to a user of a mobile device in various contexts wherein the transitory contacts of interest are exclusive of stored contacts on the user's mobile device;
- identifying various contexts applicable to the user;
- sorting the transitory contacts of interest into transitory contact types;
- mapping the various contexts to the transitory contact types into a mapping table in memory of the mobile device;
- deriving a present context pertaining to a user of the mobile device;
- querying the mapping table for transitory contact types applicable to the present context;
- dynamically rendering the applicable transitory contact types to the user in a transitory contacts screen on the mobile device such that the applicable transitory contact types are displayed in the transitory contact screen on the mobile device, are specific to the present context and are subject to change when the present context changes; and
- responsive to the user selecting one of the applicable transitory contact types, displaying the transitory contacts of interest in the transitory contacts screen on the mobile device corresponding to the transitory contact type.

16. The computer program product of claim 15 further comprising monitoring the present context of the user and responsive to a change in the present context, repeating querying, dynamically rendering and displaying.

17. The computer program product of claim 16 further comprising automatically removing the transitory contact types from the transitory contact screen when the present context changes and one or more transitory contact types previously displayed in the transitory contact screen are no longer applicable to the present context.

18. The computer program product of claim 15 wherein the present context is the user's current location and the user's situation at the current location.

19. The computer program product of claim 15 wherein identifying various transitory contacts includes searching the internet and searching social data of the user, the user's friends and the user's stored contacts.

20. The computer program product of claim 15 wherein dynamically rendering the applicable transitory contact types automatically appears in the transitory contacts screen of the mobile device for any present context.

* * * * *